United States Patent [19]

Terayama et al.

[11] Patent Number: 4,866,549

[45] Date of Patent: Sep. 12, 1989

[54] GUIDE MECHANISM FOR OPTIMIZING THE POSITION OF A TAPE TAKE-OUT DEVICE IN A MAGNETIC TAPE LOADING AND UNLOADING APPARATUS

[75] Inventors: Takao Terayama, Ushiku; Hajime Yokota, Katsuta, both of Japan

[73] Assignee: Hitachi, Ltd., Tokyo, Japan

[21] Appl. No.: 155,886

[22] Filed: Feb. 16, 1988

[30] Foreign Application Priority Data

Feb. 25, 1987 [JP] Japan ................................. 62-42097

[51] Int. Cl.$^4$ .......................................... G11B 15/665
[52] U.S. Cl. ...................................................... 360/85
[58] Field of Search ............................................ 360/85

[56] References Cited

U.S. PATENT DOCUMENTS 4,322,761  3/1982  Beitler et al. .......................... 360/85
4,353,101  10/1982  Kawai .................................... 360/85

Primary Examiner—Robert S. Tupper
Attorney, Agent, or Firm—Antonelli, Terry & Wands

[57] ABSTRACT

A magnetic tape loading apparatus includes a magnetic tape take-out device slidingly movable on a base and tape take-out device control means of cam type provided on such a base, in order to maintain a predetermined positional relation between the magnetic tape and a rotational cylinder, when the magnetic tape contained within the cassette is taken out as helically wound around the rotational cylinder or it is stored into the cassette.

4 Claims, 3 Drawing Sheets

GUIDE MECHANISM FOR OPTIMIZING THE POSITION OF A TAPE TAKE-OUT DEVICE IN A MAGNETIC TAPE LOADING AND UNLOADING APPARATUS

BACKGROUND OF THE INVENTION

This invention relates to a magnetic tape loading apparatus and, more particularly, to an improved magnetic tape loading apparatus suitable for protecting the tape from being dislodged out of a tape guide and from being damaged in the process of taking the tape out of or placing it into a cassette.

A cassette type magnetic recording and reproducing device such as a video tape recorder has been so is known as shown in U.S. Pat. No. 4,353,101 in which the tape contained within the cassette is taken into a predetermined location out of the cassette when the cassette is set in the video tape recorder prior to running operation of the tape at that location. In such a conventional video tape recorder, a rotational cylinder is inclined to register a signal on the tape and to reproduce the signal from the tape. In order to securely or accurately contact the tape with the inclined rotational cylinder, the position and inclination of the tape take-out device after pulling the tape out of the cassette are precisely calculated and controlled from the results of such calculation.

Thus one example of such a conventional tape take-out device is illustrated in FIGS. 8 and 9. FIGS. 8 and 9 are front and side views of the tape take-out device, respectively. In those figures, a tape guide 12 is provided at both upper and lower end portions thereof with flanges 24A and 24B to restrict the upward or downward displacement of a tape 4. A second tape guide 11 is fixed on a common shifting base 25 together with the tape guide 12. The shifting base 25 is mounted on a guide member 28 which is securely fixed on a chassis 26 by means of screw fasteners 27A, 27B. Guide pins 29A, 29B are connected with the lower surface of the shift base 25, these guide pins 29A, 29B being fitted in a central groove of the guide member 28. Further, a spring member 30 is attached on the lower surface of the shifting base 25 by a screw 31 from the downside of the guide member 28 so that the shifting base 25 and the spring 30 hold the guide member 28 therebetween with suitable spring force. Connected to the guide pin 29A is a link 32, which is connected to tape take-out device driving means (not shown), so as to move the shifting base 25 along the groove on the guide member 28. Also, the shifting base 25 slides with its lower sliding surfaces 33A, 33B contacting on the guide member 28, while the outer peripheral surfaces of the guide pins 29A, 29B slide along side surfaces 34A, 34B of the groove of the guide member 28.

However, a shifting passage of the above-mentioned conventional tape take-out device has been designed in such a manner that the tape take-out device is merely protected from interference of the remaining members during operations such as taking out or storing the tape. On one hand, a shape of the upper surface of the guide member on which the tape take-out device slides is thus usually either formed on parallel to the chassis surface or formed at a slight inclination with respect to the chassis surface. On the other hand, a rotational cylinder is slantedly mounted so that the tape take-out device will move along the guide member as previously formed transferring the tape forcibly to press this tape against the rotational cylinder, whereby this causes problems such as, partially damaging the tape because of excessive force locally exerted on the tape, and the tape is dislodged from the tape take-out device.

SUMMARY OF THE INVENTION

Accordingly, one object of the present invention is to solve these defects in a magnetic tape loading apparatus by optimizing a posture of the tape take-out device with respect to the tape in process of taking out or storing the tape, thereby preventing the tape from local application of excessive force, and to provide an improved magnetic tape loading apparatus.

A further object of the present invention is to realize tape loading by means of a simple reliable mechanism, which eliminates unfavorable influences on the tape in the processes of tape taking out and storing.

A magnetic tape loading apparatus according to the present invention comprises a rotational cylinder including heads, a tape take-out device for taking the tape out of and putting into the cassette, a guide member for guidance of the tape take-out device, and drive means for moving the tape take-out device along the guide member, wherein the tape take-out device is moved upwardly or downwardly in process of tape taking out and storing operations, and controlling means for inclined movement of the tape take-out device in fore-and-aft and left-and-right directions is provided on the guide member.

These and further objects and advantages of the present invention will become clearer with reference to the following detailed description of an illustrative embodiment of this invention.

DESCRIPTION OF THE PREFERRED EMBODIMENT

Figure 1:
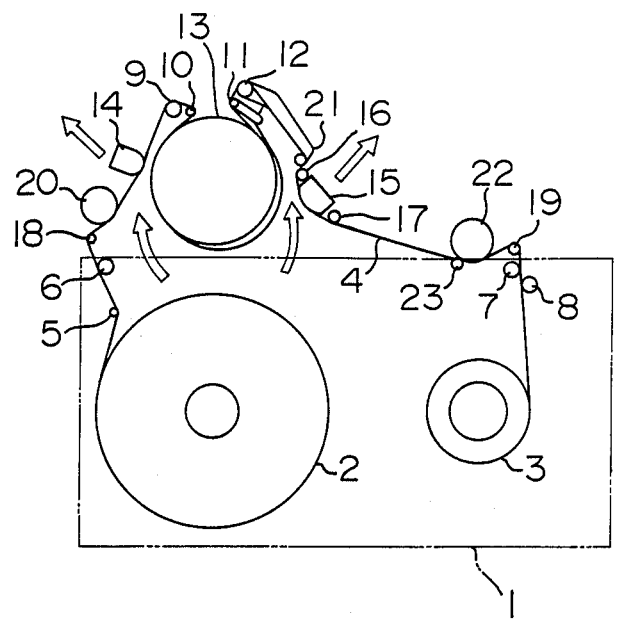
FIG. 1 is a plan view showing a cassette type magnetic recording and reproducing device after pulling cut the tape out of the cassette.

One example according to the present invention will be explained hereinafter with reference to the drawings. In these figures, the same portions as the conventional ones are designated by the same reference numerals, and therefore, the detailed description of the same portions has been thus omitted.

In FIG. 1, reels 2, 3 are contained within a cassette 1 so that a tape 4 wound around the reel 2 is taken up around the reel 3 passing through a number of tape guides 5, 6, 7, 8 disposed in the cassette 1. Tape guides 9, 10, and 11, 12 for taking the tape out of the cassette are positioned initially within the cassette 1 (inside the casing of the cassette shown by a double-dashed chain line). These tape guides 9, 10, and 11, 12 move toward their respective positions shown in the FIG. 1, passing in proximity to the opposite sides of a rotational cylinder 13 on which magnetic heads are mounted, when the tape taking out operation proceeds progressively. An erasing head 14, a control head 15 and tape guides 16, 17 which interrupt the tape taking out operation are displaced toward the opposite sides of the rotational cylinder 13 in synchronism with the tape taking out operation. Also, tape guides 18, 19, 21 are initially located within the cassette 1 but they are transferred to the illustrated positions in synchronism with the tape taking out operation. A stationary tape guide 20 is provided at the illustrated position. A pinch roller 22 is moved in synchronism with the tape taking out operation so that it contacts a fixed-type capstan 23 to engage the tape against the capstan 23.

Figure 5:
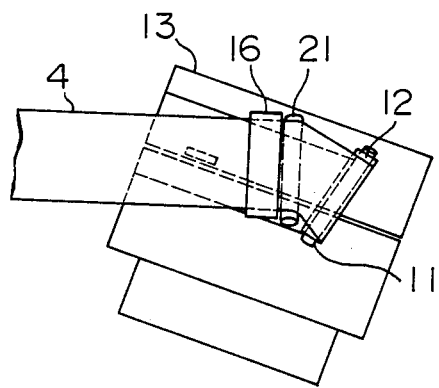
FIG. 5 is a side view showing the tape to be loaded by the tape take-out device of the present
Figure 6:
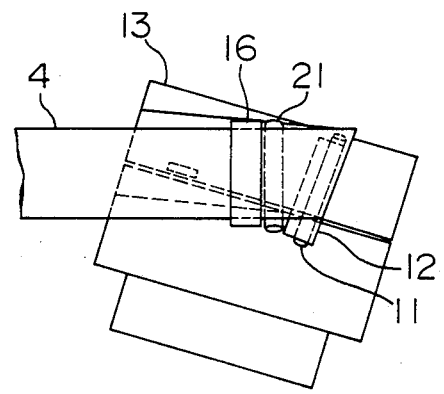
FIG. 6 is a side view showing the tape to be loaded by the conventional tape take-out device.
Figure 7:
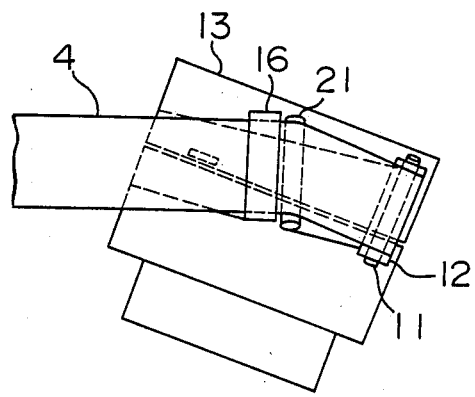
FIG. 7 is a side view showing the tape in running condition.
Figure 8:
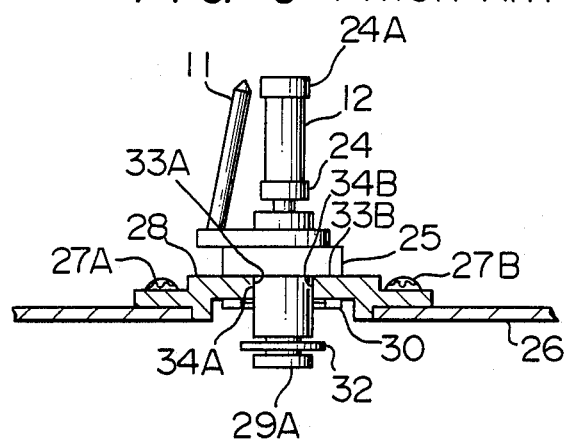
FIGS. 8 and 9 are front and side views of the conventional tape take-out device, respectively.
Figure 9:
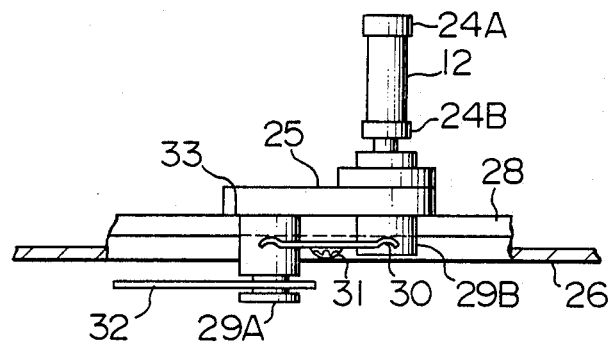

Further the rotational cylinder 13 is inclined with respect to the cassette 1. The tape 4 is helically contacted around this rotational cylinder 13 to record the signal on the tape or reproduce the signal from the tape. The tape 4 after completion of the recording or the reproduction has an inclined posture when it leaves the rotational cylinder 13, so that the tape guides 11, 12 and 21 are also inclined with respect to the cassette 1 in order to turn the inclined tape toward the horizontal direction (FIG. 5).

Figure 2:
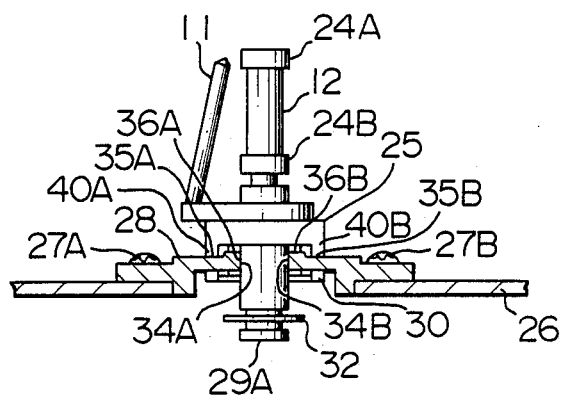
FIGS. 2 and 3 are front and side views of a tape take-out device according to one embodiment of the present invention, respectively.
Figure 3:
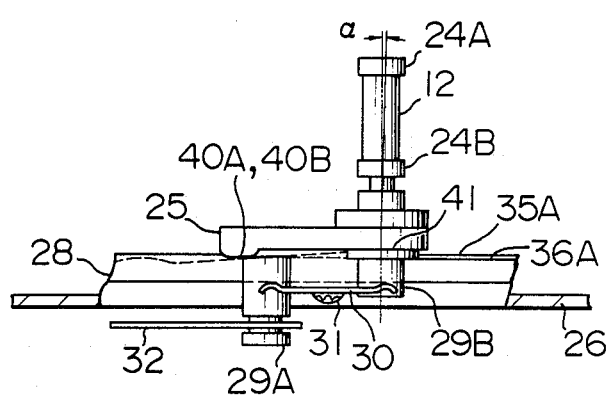
Figure 4:
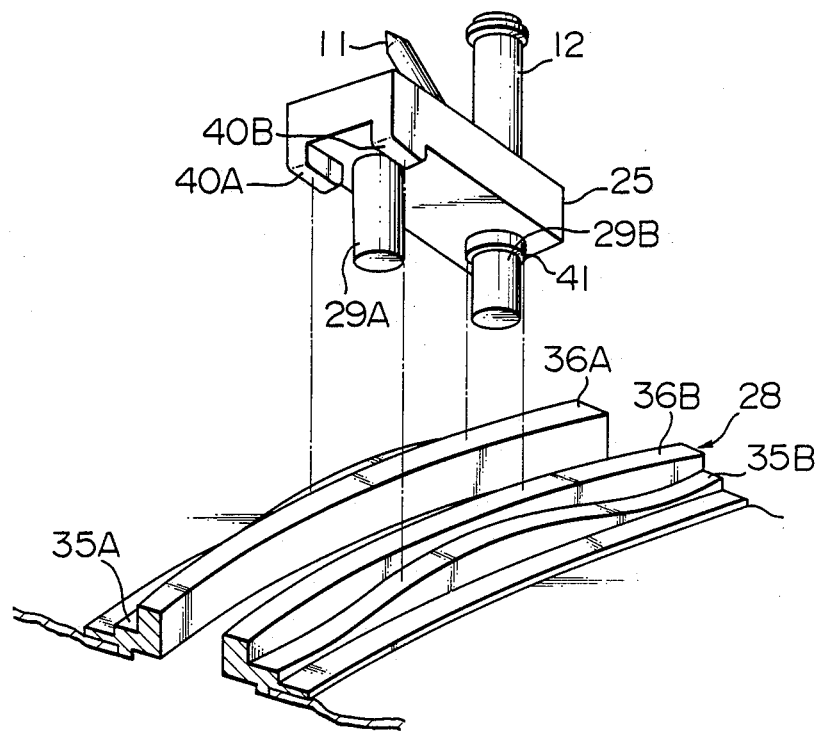
FIG. 4 is a perspective view of a tape take-out device in accordance with the present invention.

In the tape take-out device, as shown in FIGS. 2 and 4, tape guides 11, 12 are together fixed on a shifting base 25, which is mounted on a guide member 28. On the upper surface of the guide member 28, bearing surface 35A, 35B and 36A, 36B each defining the individual surfaces are provided, on which the shifting base 25 can be slidingly movable. The bearing surfaces 35A, 35B are slidingly contacted with slider portions 40A, 40B provided at both left and right ends of the lower surface of the shifting base 25, whereas a slider portion 41 provided on a guide pin 29 may slidingly contact with the bearing surfaces 36A, 36B. In an arrangement of the guide member 28, if a height of each right bearing surface 35B, 36B is varied with respect to that of each left bearing surface 35A, 36A, the shifting base 5 is inclined leftward and rightward depending on the difference between both height of the opposite bearing surfaces. Furthermore, if a height of each bearing surface 36A, 36B is altered with respect to that of each bearing surface 35A, 35B, the shifting base 25 is inclined frontward and rearward depending on the difference between the heights of both bearing surfaces to cause the tape guides 11, 12 to tilt frontward and rearward (with an angle α in FIG. 3).

Thus the bearing surfaces 35A, 35B, 36A, 36B and the slider portions 40A, 40B, 41 may constitute tape take-out device controlling means.

When the cassette 1 is mounted on the video tape recorder and the tape guides 11, 12 convey the taken-out tape 4 to the rotational cylinder 13, the slider portions 40A, 40B of the shifting base 25 slide on the bearing surfaces 35A, 35B while the slider portion 41 slides on the bearing surfaces 36A, 36B, respectively. At that time, the shifting base 25 will be transferred upward and downward depending on the respective heights of the bearing surfaces 35A, 35B, 36A, 36B as well as inclined leftward, rightward, frontward and rearward. The tape guides 11 and 12 thus behave similar to the movement of the shifting base. In this case, positions, a direction of inclination and a tilt angle for the tape guides 11 and 12 are previously precisely predetermined by the calculation so as to optimize the tape turning condition free from subjecting the tape 4 to an excessive local force. The tape can thus be protected from such unreasonable force without incurrence of the tape damage. The functions obtained during the tape taking out operations will be accomplished in the same way upon storing of the tape.

In the conventional tape take-out device, since the unfavorable excessive force is locally exerted on the tape 4 passing through the rotational cylinder 13, the tape guides will tend to dislodge from the tape guides 11, 12. When this condition of the tape becomes worse, the tape 4 is deviated from the tape guides 11, 12 and, therefore, it is almost impossible to continuously take-out or store the tape.

The conditions for running the tape according to the present invention are substantially the same as the conventional one. The tape 4 after passing through the rotational cylinder 13 runs downwardly before it is turned and passes through the tape guides 21, 16. Finally the tape runs substantially parallel to the cassette 1, and it is then retrieved around the reel 3.

Further, in the embodiment as previously described, a cross-sectional shape of the bearing surfaces 36A, 36B of the guide member 28 may be formed as a common circular groove, which in turn receives the slider portion 41 of the guide pin 29B. The slider portion 41 in this case may be formed spherical corresponding to the concave of the circular groove.

Furthermore, the same effects will be obtained even when a cross-sectional shape for the bearing surfaces 36A, 36B of the guide member 28 is formed as an inversely extending concaved circular arc, and the slider portion 41 of the guide pin 29B may be formed spherical to contact with this inverted corresponding groove of a common circle.

As has been described above, it is possible due to the present invention to transfer the tape in a three-dimensional optimum attitude through the tape take-out member during the process of the tape taking out or tape storing, without damaging the tape or dislodging it from the tape guides.

What is claimed is:

1. A magnetic tape loading apparatus comprising: a rotational cylinder, a magnetic head mounted on the circumference of said cylinder, a tape take-out device for taking the tape out of and into the cassette and for engaging the tape taken out of the cassette against a path on the circumference of said cylinder, a guide member for defining a shifting path of said tape take-out device, and means for moving said tape take-out device along said guide member, wherein said guide member includes means for moving said tape take-out device upwardly and downwardly and for inclining the same fore-and-aft and right-and-left during tape taking out and tape storing operations.

2. A magnetic tape loading apparatus according to claim 1, wherein said tape take-out device moving means includes two slider portions provided leftside and rightside of said tape take-out device bottom and one slider portion on the center axis of the same, and bearing surfaces on which said slider portions slide are provided leftside and rightside on said guide member, with both leftside and rightside bearing surfaces varying in height along a longitudinal direction.

3. A magnetic tape loading apparatus according to claim 1 or 2, wherein said tape take-out device moving means includes sliders provided leftside and rightside of said tape take-out device bottom and with a spherical surface on the center axis of the same, and the widthwise cross-sectional shape of the bearing surfaces is a concave circular arc of constant diameter.

4. A magnetic tape loading apparatus according to claim 1 or 2, wherein said tape take-out device moving means are provided with two sliders leftside and rightside on the lower surface of the tape take-out device and with one spherical surface on the center axis of said tape take-out device bottom surface, and a widthwise cross-sectional shape of the bearing surfaces is formed V-shaped in an upper part.

* * * * *